(12) United States Patent
Cherubini

(10) Patent No.: US 7,881,009 B2
(45) Date of Patent: Feb. 1, 2011

(54) POSITIONING OF PLANTS IN SERVO SYSTEMS

(75) Inventor: Giovanni Cherubini, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/141,174

(22) Filed: Jun. 18, 2008

(65) Prior Publication Data

US 2009/0002869 A1 Jan. 1, 2009

(30) Foreign Application Priority Data

Aug. 17, 2007 (EP) .................................. 07114524

(51) Int. Cl.
*G11B 5/55* (2006.01)
(52) U.S. Cl. ...................................... 360/78.04; 360/75
(58) Field of Classification Search ........................ None
See application file for complete search history.

(56) References Cited

U.S. PATENT DOCUMENTS

| | | | | |
|---|---|---|---|---|
| 5,872,439 | A * | 2/1999 | Nomura ....................... | 318/632 |
| 6,476,998 | B2 * | 11/2002 | Cheung .................... | 360/78.04 |
| 6,747,836 | B2 * | 6/2004 | Stevens et al. ............ | 360/77.02 |
| 6,791,786 | B2 * | 9/2004 | He et al. ....................... | 360/75 |
| 6,975,482 | B1 * | 12/2005 | Guo et al. ................ | 360/78.05 |
| 7,031,093 | B2 * | 4/2006 | Suzuki ......................... | 360/75 |
| 7,158,334 | B2 * | 1/2007 | Iwashiro .................. | 360/77.02 |
| 7,319,570 | B2 * | 1/2008 | Jia et al. ................... | 360/77.02 |
| 7,382,712 | B2 | 6/2008 | Cherubini et al. | |
| 7,486,470 | B1 * | 2/2009 | Semba .................... | 360/77.01 |

(Continued)

OTHER PUBLICATIONS

A. Pantazi, et al. "Servomechanism for a MEMS-based scanning-probe data storage device," Nanotechnology 15, S612-S621 (2004) UK.

(Continued)

*Primary Examiner*—Hoa T Nguyen
*Assistant Examiner*—James L Habermehl
(74) *Attorney, Agent, or Firm*—Vazken Alexanian

(57) ABSTRACT

Apparatus is provided for fast-adjustment of the position of a plant in a servo system in which a servo output indicative of the plant position is provided to a positioning system for positioning the plant in dependence on the servo output. The apparatus includes an adjustment signal generator, operable in a fast-correction mode and a shock-compensation mode, for generating an adjustment signal for supply to the positioning system to effect fast positional adjustment of the plant. The apparatus also has an adjustment controller for receiving the servo output. The adjustment controller is adapted to detect from the servo output occurrence of a disturbance affecting positioning of the plant and, in response, to initiate the shock-compensation mode of the adjustment signal generator. The adjustment controller is further adapted to initiate the fast-correction mode of the adjustment signal generator in response to indication of an error in positioning of the plant. On initiation of each mode, the adjustment controller supplies an input signal dependent on the servo output to the adjustment signal generator. The adjustment signal generator processes the input signal to generate the adjustment signal such that, in the fast-correction mode the adjustment signal effects adjustment of the plant position to correct the positioning error, and in the shock-compensation mode the adjustment signal effects adjustment of the plant position to counter the effect of the disturbance.

5 Claims, 7 Drawing Sheets

U.S. PATENT DOCUMENTS

| | | | |
|---|---|---|---|
| 7,529,057 B1 * | 5/2009 | Sutardja | 360/77.02 |
| 7,663,704 B2 * | 2/2010 | Onomatsu et al. | 348/732 |
| 2004/0233570 A1 | 11/2004 | Devasia et al. | |

OTHER PUBLICATIONS

S. P. Panda, "Application of track following tape drive control," Proceedings of the American Control Conference 2003, vol. 1, pp. 20-24, 4-6 Jun. 2003. US.

R. Horowitz et al., "Microactuators for Dual-Stage Servo Systems in Magnetic Disk Files," Handbook of Nanotechnology, B. Bhushan (Ed.) (Springer, Berlin, Heidelberg 2004) US.

H. T. Ho, "Fast servo bang-bang seek control," IEEE Transactions on Magnetics, vol. 33, No. 6, pp. 4522-4527, Nov. 1997. US.

Y. Mizoshita et al, "Vibration minimized access control for disk drives," IEEE Transactions on Magnetics, vol. 32, No. 3, pp. 1793-1798, May 1996. US.

S. Pannu et al, "Adaptive accelerometer feedforward servo for disk drives," Prcdngs of the 36th Conf on Decision & Control, vol. 5, pp. 4216-4218, Dec. 10-12, 1997 US.

S. Imagawa et al, "Actuator control to suppress disturbances for 8cm DVD-RAM video camera recorder," IEEE Trans. Cons Electronics, vol. 47, Aug. 2001 US.

S. P. Panda et al, "Minimization of tape transient disturbances in track following tape drives with a disturbance observer," Microsystems Tech, vol. 10 Dec. 2003 US.

\* cited by examiner

POSITIONING OF PLANTS IN SERVO SYSTEMS

This application claims priority under 35 U.S.C. §119 from European Patent Application No. 0711452.4 filed Jun. 29, 2007, the entire contents of which are incorporated herein by reference.

The present invention relates generally to the positioning of plants in servo systems in which a servo output, indicative of the plant position, is provided to a positioning system for positioning the plant in dependence on the servo output. More particularly, apparatus is provided for fast-adjustment of the position of such a plant, together with devices incorporating such apparatus.

The operation of various devices involves the positioning of some form of physical plant with the aid of feedback from a servo mechanism. The servo mechanism measures actual plant position in some manner and provides the resulting positional information to the positioning system which controls positioning of the plant accordingly. As well as a drive mechanism for effecting positioning of the plant, the positioning system typically incorporates some form of control circuitry for processing the servo output to generate a control signal for the drive mechanism. Data storage devices provide a particular example of systems involving servo-controlled positioning of a plant. The following description will focus on data storage devices as exemplary applications. However, the present invention to be described can be applied in other systems which rely on positioning of a plant and in which similar considerations therefore apply.

The plant in data storage devices is the read/write mechanism, e.g. the actuator incorporating the read/write head in tape drives and disk drives, or the scanner incorporating the probe-array in probe-storage devices as described, for example, in IBM Journal of Research & Development, Volume 44, No. 3, May 2000, pp. 323-340, "The 'Millipede'—More Than One Thousand Tips for Future AFM Data Storage", Vettiger et al., and in IEEE Transactions on Magnetics, Volume 39, No. 2, March 2003, pp. 938-945, "Millipede—a MEMS-based Scanning-probe Data-storage System", Eleftheriou et al. Whatever the data storage system, it is desirable to control the position of the read/write mechanism relative to the storage-medium surface so as to facilitate the correct reading or writing of data, and the function of the servo system is to facilitate this positional control. One of the main functions of the servo system in storage devices is to locate the data track in which data is to be written or read. This is achieved by the so-called "seek-and-settle" procedure. During the "seek" mode the read/write mechanism is rapidly moved to a position close to the target track. The additional step of moving from that position to the center of the target track is the subject of the "settle" mode. During the seek and settle operations, no reading or writing of user data can be performed so it is desirable to keep these modes to a reduced duration. A further fundamental function of the servo system is maintaining the position of the read/write mechanism on the center of the target track as the mechanism moves along the length of the track during a normal read/write operation. This is done by the "track follow" procedure. This procedure should be able to provide track following in spite of disturbances such as external shocks transmitted to the actuator or tape-shifts resulting in tape oscillations in tape drives. More precise positioning and navigation of the read/write mechanism on the track centerlines is of importance in all types of storage devices Various plant position control systems involving servo mechanisms are known in the art. The design of a servo system for positioning and navigation of the probe-array over the storage medium in a scanning-probe storage device is presented in "A Servomechanism for a micro-electro-mechanical-system-based scanning-probe data storage device", Pantazi et al., Nanotechnology 15, S612-S621 (2004). This system adopts a discrete-time state-space model of the scanner motion and introduces a controller design based on the linear quadratic Gaussian (LQG) approach. In this design, the x/y-positional information of the scanner is provided by thermal position sensors. A method to extract track-ID and cross-track information from special servo data patterns, enabling reliable location of a target track position during a settle mode, is described in US Patent Application Publication 2006/0039250A1. The application of track-following servo for tape drives is described in "Application of track following tape drive control", S. P. Panda, Proceedings of the American Control Conference 2003, vol. 1, pp. 20-24, 4-6 Jun. 2003. Track-following servo for tape drives is commonly based on timing-based servo (TBS). In TBS systems, special servo patterns consist of transitions with two different azimuthal slopes, and head position is derived from the relative timing of pulses generated by a narrow head reading the patterns. A transversal position error signal can thus be computed and used as a feedback signal by the track-following servo. The foregoing methods, and similar methods based on classical servo control systems, do not address the issue of faster motion of the read/write mechanism beyond the normal capabilities of the servo-controlled positioning system.

A method for the faster positioning of physical systems, based on feed-forward design for output transitions and with particular application to hard-disk drives, is presented in US Patent Application Publication 2004/0233570A1. A feedback/feedforward control system using reference trajectories in hard-disk drives is discussed in "Microactuators for Dual-Stage Servo Systems in Magnetic Disk Files", Handbook of Nanotechnology, B. Bhushan (Ed.) (Springer, Berlin, Heidelberg, 2004), Part E, Chap. 32, pp. 951-981. Target trajectories are typically obtained by applying proximate time-optimal and/or minimum-vibration control methods as described in the following: "Fast servo bang-bang seek control", H. T. Ho, IEEE Transactions on Magnetics, Vol. 33, No. 6, pp. 4522-4527 November 1997; and "Vibration Minimized access control for disk drives", Mizoshita et al., IEEE Transactions on Magnetics, Vol. 32, No. 3, pp. 1793-1798, May 1996. Such methods, however, are based on non-negligible computational complexity for determining the control signal to be applied to the positioning system. In addition, they do not provide a means for adjusting the trajectory during track following as necessary to compensate for disturbances such as external shocks. To counter the effect of shocks, several devices have been manufactured with shock sensors. Accelerometer-based feedforward servo mechanisms for hard-disk drives and DVD camera recorders are respectively described in the following: "Adaptive accelerometer feedforward servo for disk drives", Pannu et al., Proceedings of the 36$^{th}$ Conference on Decision & Control, vol. 5 pp. 4216-4218, 10-12 Dec. 1997; and "Actuator control to suppress disturbances for 8 cm DVD-RAM video camera recorder", Imagawa et al., IEEE Trans. Consumer Electronics, Vol. 47, No. 3, pp. 528-533, August 2001. A disturbance observer for mitigation of tape transient disturbances in track-following servo for tape drives is described in "Minimization of tape transient disturbances in track following tape drives with a disturbance observer", Panda et al., Microsystems Technologies, Vol. 10, No. 1, pp. 11-16, December 2003. The design of the observer is based on finding the inverse of the plant transfer function, which severely limits the efficiency of the method and the frequency band of the disturbances that can be satisfactorily suppressed.

According to an embodiment of a first aspect of the present invention, there is provided an apparatus for fast-adjustment of the position of a plant in a servo system in which a servo output indicative of the plant position is provided to a positioning system for positioning the plant in dependence on the servo output. The apparatus comprises:

an adjustment signal generator, operable in a fast-correction mode and a shock-compensation mode, for generating an adjustment signal for supply to the positioning system to effect fast positional adjustment of the plant; and an adjustment controller for receiving said servo output, the adjustment controller being adapted to detect from the servo output occurrence of a disturbance affecting positioning of the plant and, in response, to initiate the shock-compensation mode of the adjustment signal generator, and adapted, in response to indication of an error in positioning of the plant, to initiate the fast-correction mode of the adjustment signal generator, and to supply an input signal dependent on the servo output to the adjustment signal generator on initiation of each said mode;

wherein the adjustment signal generator is adapted to process the input signal to generate the adjustment signal such that, in the fast-correction mode the adjustment signal effects adjustment of the plant position to correct said error, and in the shock-compensation mode the adjustment signal effects adjustment of the plant position to counter the effect of said disturbance.

Thus, fast-adjustment apparatus embodying the present invention is operable in two modes to generate an adjustment signal. This adjustment signal is supplied in operation to the positioning system to effect fast positional adjustment of the plant, where "fast" here means faster than is achieved by the positioning system in its normal operation in response to the servo output. The adjustment signal is produced by an adjustment signal generator under control of an adjustment controller which initiates operation of the adjustment signal generator when desired. In particular, the adjustment controller receives the servo output in operation. If the servo output indicates the occurrence of a disturbance, such as a shock or tape-shift, which affects positioning of the plant then the adjustment controller initiates a shock compensation mode of the adjustment signal generator. In addition, the adjustment controller initiates a fast-correction mode of the adjustment signal generator in response to indication of an error in positioning of the plant. In both cases, the adjustment controller provides an input signal to the adjustment signal generator which depends on the servo output. The adjustment signal generator then produces the adjustment signal by processing this input signal. The input signal, and the processing performed by the adjustment signal generator, are such that the resulting adjustment signal effects the fast-adjustment of the plant position by the positioning system, i.e. to correct the positional error in the fast-correction mode or to counter the effect of the disturbance in the shock compensation mode. Embodiments of the invention thus provide a mechanism for temporarily increasing the bandwidth of the positional control system to effect fast positional adjustments. Moreover, this is done in a particularly simple and efficient manner for both disturbance compensation and fast positional corrections. The adjustment controller can initiate the corresponding action in both modes, and in both cases the adjustment signal is generated by processing an input derived from the servo channel output. The same general processing techniques can be employed in both cases as discussed further below. The adjustment controller also uses the same servo output to detect the occurrence of disturbances such as shocks, avoiding the need for additional shock sensors such as accelerometers. Overall, therefore, a highly efficient system is provided for dealing with the problem of fast-adjustment of the position of a plant in a servo channel. This offers performance benefits for devices employing such mechanisms. In storage devices, for example, fast-adjustment of the position of the read/write mechanism is desirable for overall system performance in terms of access time, overhead for storing servo information, stop-write event probability, and power consumption, for example.

As indicated above, the fast-correction mode is initiated by the adjustment controller in response to indication of a positional error, and results in an adjustment signal which effects correction of the error. This positional error may arise in various circumstances in devices embodying the invention. In storage devices, for example, such an error may arise where the track reached by the read/write mechanism in the seek-and-settle procedure does not correspond to the target track. In this case, the positional error can be signaled to the adjustment controller to initiate corrective action via the fast-adjustment process. In general, however, the positional error which triggers the fast-correction mode need not result from a failure of the positioning system, but may simply be a difference between the current and desired plant position which can be corrected by fast-adjustment, for example fine positional adjustment at the end of a normal positioning operation.

The adjustment signal generator comprises a filter for generating the adjustment signal in each mode. In particular, the adjustment signal generator can be implemented by a first filter for filtering the input signal in the fast-correction mode, a delay for delaying the input signal in the shock-compensation mode, an adder for adding the input signal to the delayed input signal in the shock-compensation mode to produce a summation signal, and a second filter for filtering the summation signal in the shock-compensation mode. While separate first and second filters could be provided here, in alternative embodiments these filters may be implemented by selective configuration of a single filter to provide first and second filter characteristics. Here, the adjustment controller can select the appropriate filter configuration on initiation of a fast-adjustment mode. Other embodiments could employ separate first and second filters allowing operation of the adjustment signal generator simultaneously in the fast-correction and shock-compensation modes. In this case, the adjustment controller can supply respective input signals for the fast-correction and shock-compensation during simultaneous operation of the adjustment signal generator in both modes. The adjustment signal generator can then process the two input signals independently for the fast-correction and shock-compensation modes, and superimpose the resulting processed input signals to produce a composite adjustment signal. In any case, the filters are preferably finite impulse response filters, and in particularly preferred embodiments the coefficients of each filter are selected such that the adjustment signal corresponds to a solution of the Euler-Lagrange equations for causing the plant position to follow a target trajectory during the positional adjustment. Thus, the power consumption for the plant actuation for a given target trajectory is reduced.

The adjustment controller preferably includes a threshold detector for detecting occurrence of a disturbance from the servo output, and a finite state machine defining conditions for initiating the fast-correction and shock-compensation modes. These conditions can be dependent on both the servo output and the particular operating state of the plant as indicated by a state indicator signal received by the adjustment controller in operation. This is discussed further below.

According to an embodiment of a second aspect of the present invention, there is provided plant control apparatus for controlling the position of a plant. The apparatus comprises: a servo system comprising a servo channel for generating a servo output indicative of the plant position and a positioning system for positioning the plant in dependence on the servo output; and apparatus according to an embodiment of the first aspect of the invention for fast-adjustment of the position of the plant.

According to an embodiment of a third aspect of the present invention, there is provided a data storage device comprising: a storage medium; a read/write mechanism for writing and reading of data on the storage medium; a servo system comprising a servo channel for generating a servo output indicative of the position of the read/write mechanism relative to the storage medium, and a positioning system for positioning the read/write mechanism relative to the storage medium in dependence on the servo output; and apparatus according to an embodiment of the first aspect of the invention for fast-adjustment of the position of the read/write mechanism. Such a storage device may be, for example, a probe-storage device or a disk or tape drive.

Preferred embodiments of the invention will now be described, by way of example, with reference to the accompanying drawings in which.

Figure 5:
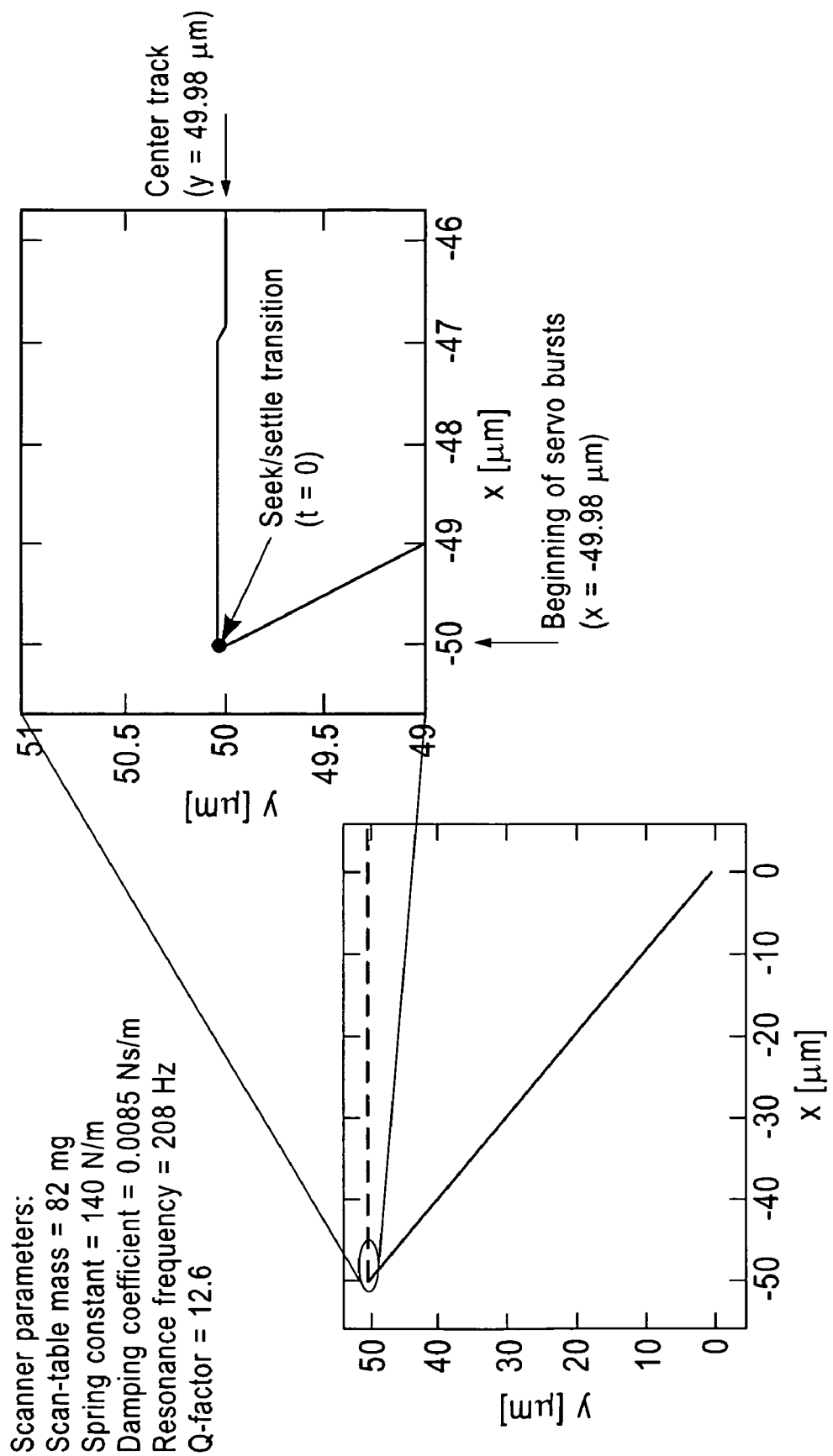
FIG. 5 illustrates operation of fast-adjustment apparatus of the embodiment in a fast-correction mode.
Figure 6:
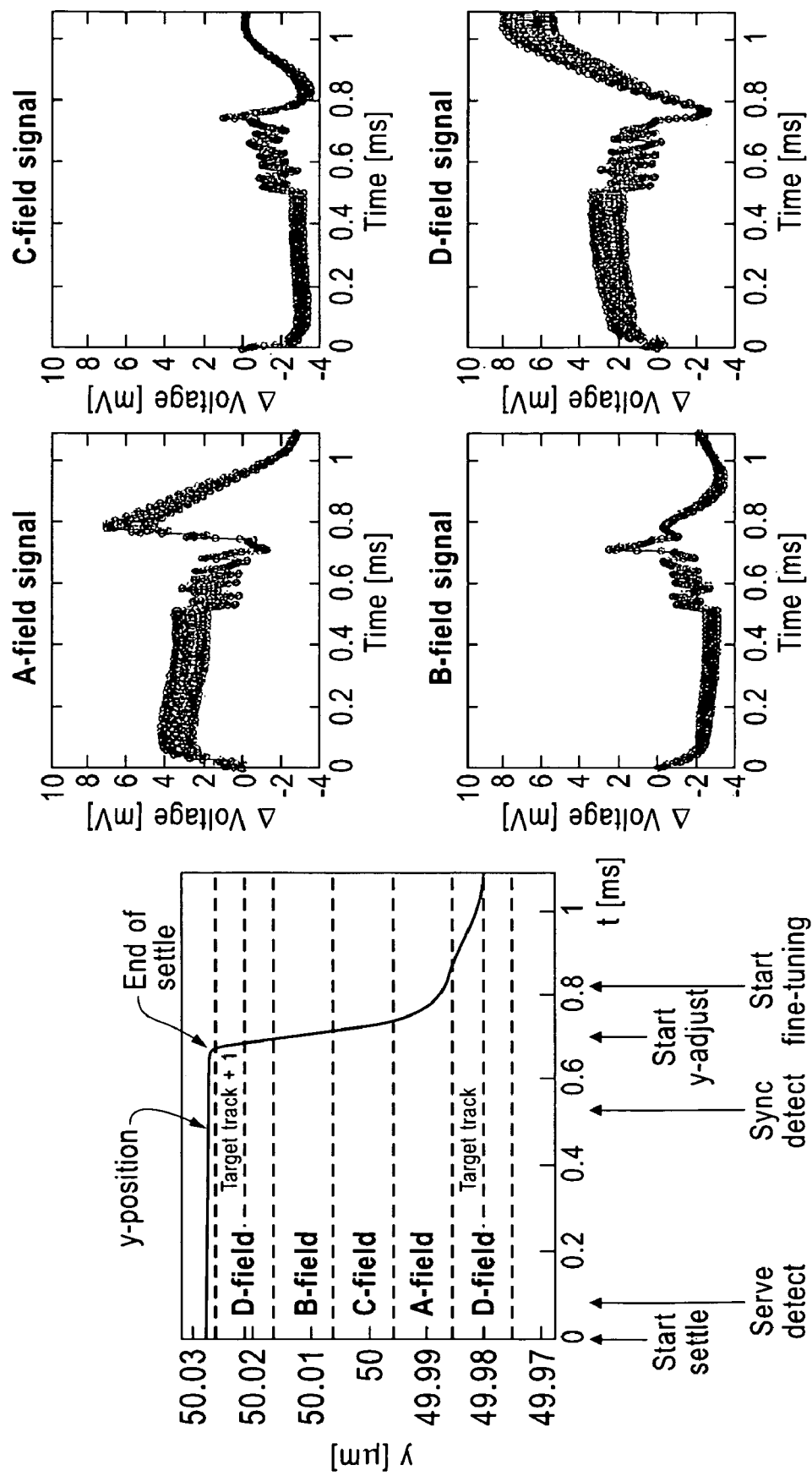
Figure 7:
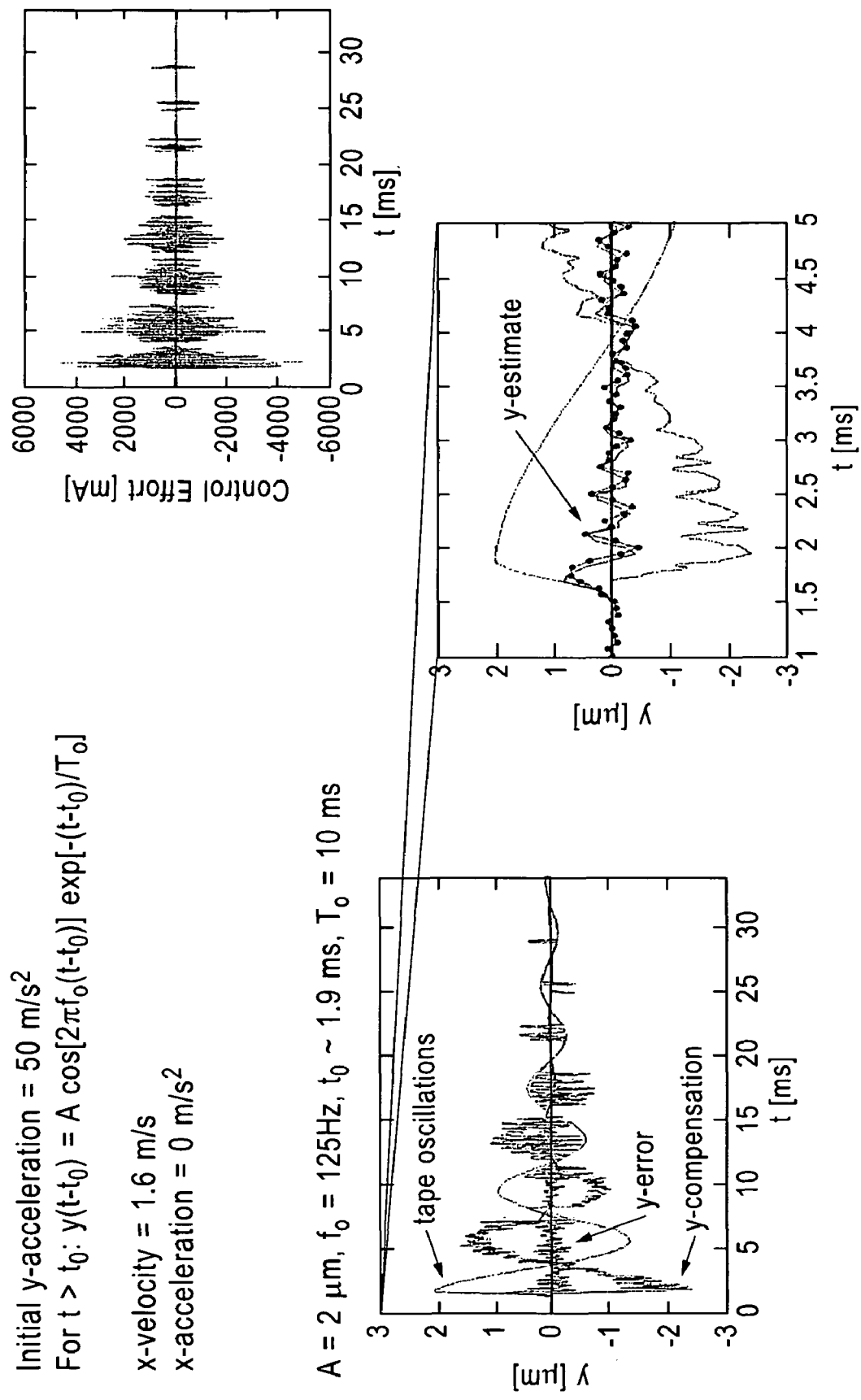
Figure 8:
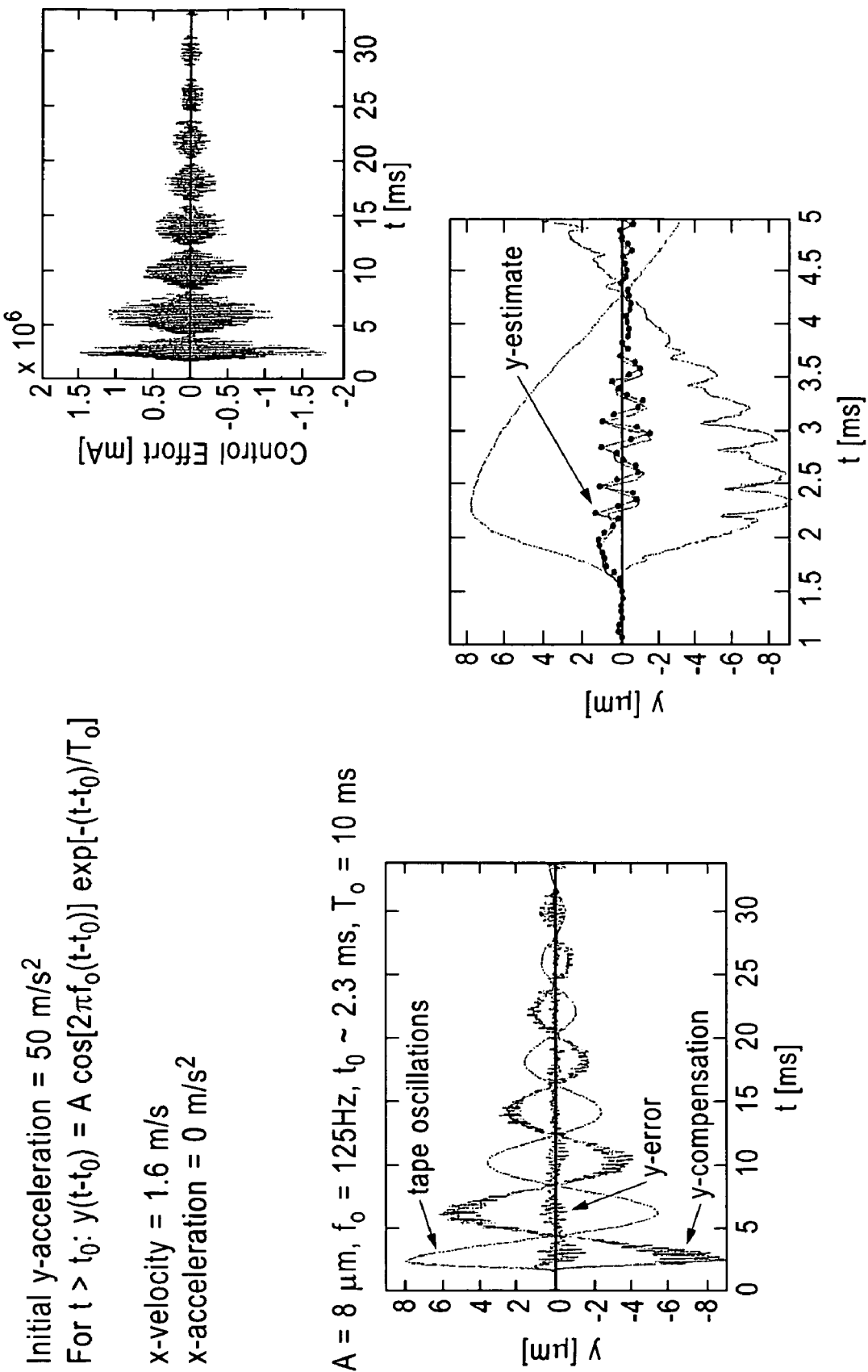

the graphs of FIG. 6 illustrate operation of the servo system of the probe-storage device in the fast-correction mode of FIG. 5; and the graphs of FIGS. 7 and 8 illustrate operation of fast-adjustment apparatus for a tape drive in a shock-compensation mode.

Figure 1:
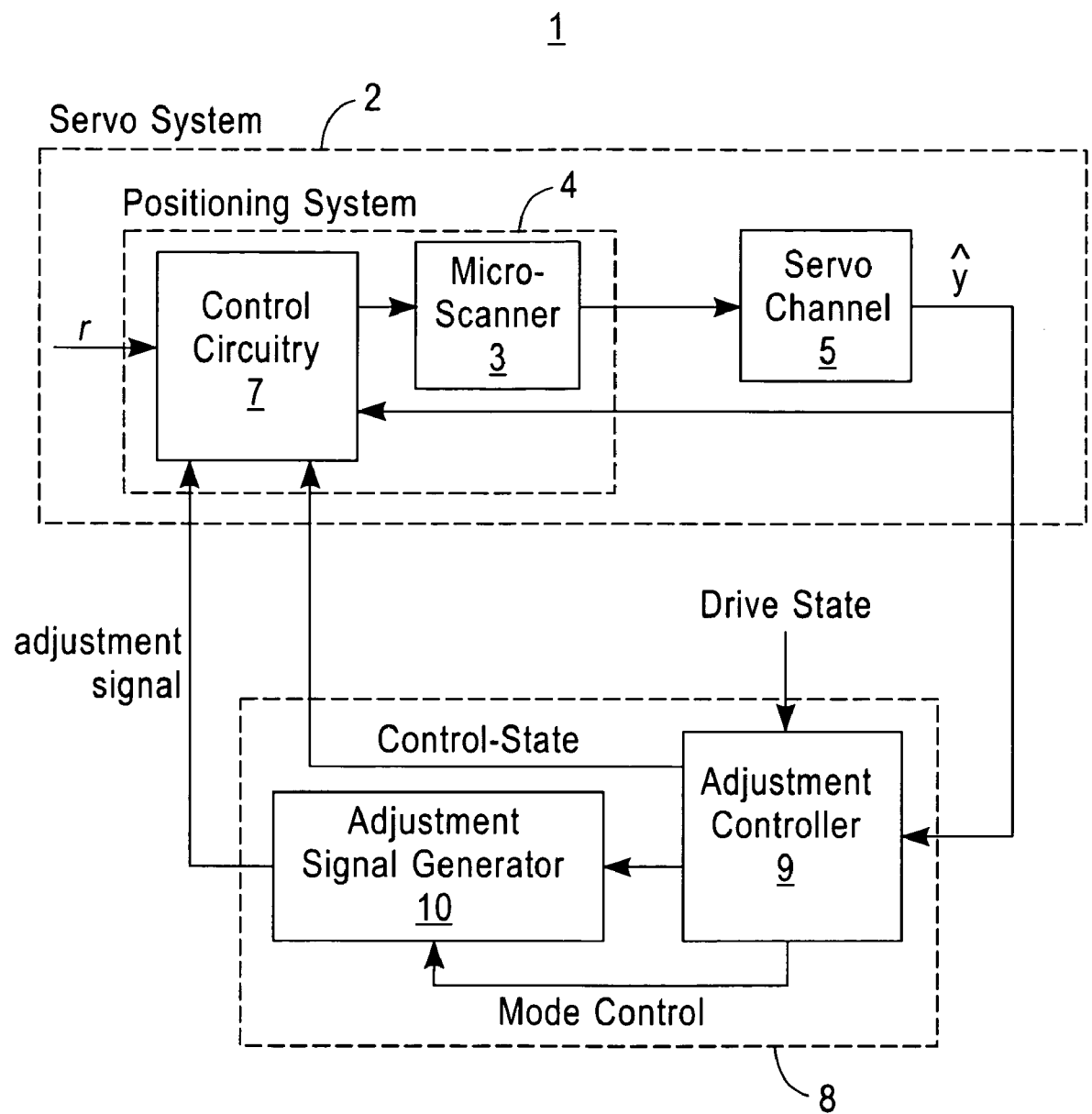
FIG. 1 is a schematic block diagram of control apparatus embodying the invention for a probe-based data storage device.

The block diagram of FIG. 1 illustrates plant control apparatus embodying the invention, in this case for a probe-based data storage device of the general type described in the IBM Journal of Research and Development reference given earlier. The control apparatus, indicated generally at 1, thus serves to control positioning of a micro-scanner, incorporating an array of read/write probes, relative to the surface of a storage medium (not shown) in the form of a polymer film. A servo system, indicated generally at 2, comprises a positioning system which is indicated generally at 4 and a servo channel 5. Signals obtained in operation from reading special servo patterns on the storage surface are supplied to servo channel 5 and processed to generate an output $\hat{y}$ indicating the measured position of scanner 3 relative to the storage surface. The positional measurements output by servo channel 5 in operation are fed back to the positioning system 4. This includes control circuitry 7 for processing the servo output $\hat{y}$ to generate a control signal for the drive mechanism of scanner 3 for effecting movement of the scanner relative to the storage surface. In this embodiment, the control circuitry 7 generates the control signal by processing the servo output $\hat{y}$ as well as a reference signal r as discussed in more detail below. The control apparatus 1 further includes fast-adjustment apparatus indicated generally at 8 in the figure. The fast-adjustment apparatus 8 comprises an adjustment controller 9 and an adjustment signal generator 10. Adjustment controller 9 is connected to receive the servo output $\hat{y}$ from servo channel 5, and also receives a drive state indicator signal from the storage drive control system (not shown) which indicates the particular operating state, e.g. seek, settle, track-follow, idle, of the drive at any given time. Based on these inputs, the adjustment controller 9 initiates operation of adjustment signal generator 10 when necessary for fast-adjustment of the position of scanner 3. Specifically, controller 9 provides a mode control signal to adjustment signal generator 10 which selects either a shock-compensation mode or a fast-correction mode for operation of the signal generator. Adjustment controller 9 also supplies an input signal $i_a$, which is dependent on the servo output $\hat{y}$, to signal generator 10 on initiation of each mode. The input signal $i_a$ is processed by adjustment signal generator 10 to produce an adjustment signal which is output to the control circuitry 7 of positioning system 4. Adjustment controller 9 also provides a control-state signal to circuitry 7 which indicates whether the fast-adjustment control is operative. This determines the control signal applied to scanner 3 in operation as explained below with reference to FIG. 2.

The basic functions of positioning system 4 in the probe-storage device are to position scanner 3 at the correct data tracks for read/write operations via the seek-and-settle procedure, and to maintain the array position on the center of target tracks during track-following as data is being written or read. The positioning system provides this basic positional control in generally known manner in response to the servo output $\hat{y}$ from servo channel 5. Various implementations, of generally known type, may be employed for control circuitry 7, and a particular example will be described below with reference to FIG. 2. In general, however, the operating requirements for the basic seek/settle and track-follow procedures are achieved by producing a relatively low bandwidth control signal to control the scanner 3. In particular, the higher bandwidth to, for example, respond effectively to vibrations resulting from a shock to the device would be beyond the normal capabilities of the control circuitry. The fast movement of the scanner for such purposes would use a servo-control system of substantially increased bandwidth. It is this issue which is addressed by the fast-adjustment apparatus 8 of the present embodiment. The fast adjustment apparatus provides a mechanism for substantially increasing the bandwidth of the control system, for a short period of time, as necessary to implement fast positional adjustment of the scanner. The normal servo operations are preferably frozen during this fast-adjustment of the scanner position. The fast-adjustment is performed in this example for positional corrections at the end of a seek-and-settle procedure, and for compensating for shocks applied to the device. Specifically, if during the settle procedure the positional information about the current track reached by the probe-array indicates that this does not correspond to the target track, then the distance from the target track is computed and fast movement of the scanner in the y-direction, i.e. the lateral or cross-track direction, is performed. This positional adjustment is effected in the fast-correction mode of signal generator 10. In addition, if during track-follow a variation of the lateral displacement of the probe array is detected which indicates occurrence of an external shock, then an adjustment signal is generated to drive the probe array in the opposite direction to compensate for the detected motion. This positional adjustment is effected in the shock-compensation mode of signal generator 10. In this exemplary embodiment, therefore, the apparatus 8 is concerned with fast positional adjustment in the y-direction only, based on the estimate ŷ of the y-position of the probe-array as measured by servo channel 5.

Figure 2:
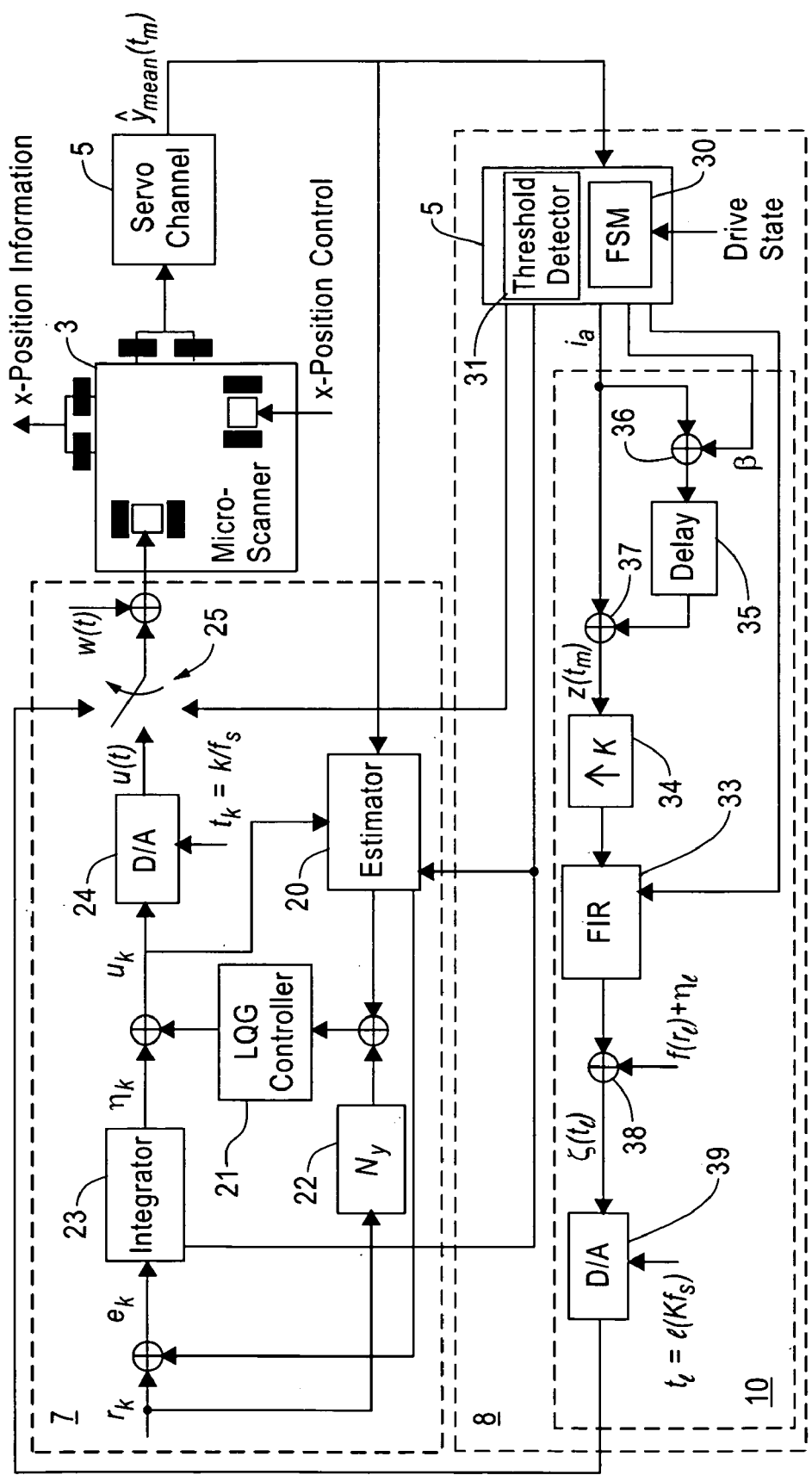
FIG. 2 is a more detailed block diagram of the control apparatus of FIG. 1.

FIG. 2 is a detailed block diagram of the control apparatus of FIG. 1 showing the components of control circuitry 7 and fast-adjustment apparatus 8. In this example, the control circuitry 7 corresponds to that described in detail in the Pantazi et al reference mentioned earlier. This uses the LQG approach with state estimation based on a discrete state-space model of the probe-array scanner dynamics. Briefly, a time-dependent state vector, indicated by the bold line in the figure, specifying scanner position and velocity in the y-direction is estimated by estimator block 20. State estimation is performed so that all state variables are considered in generating the necessary feedback signal. The state estimate is preferably produced by a Kalman filter using the control signal $u_k$ and the servo output $\hat{y}_{meas}(t_m)$ indicating the measured y-position of scanner 3. The design of the controller 21 is based on the LQG approach, in which the gain matrix of the controller 21 is given by the steady-state solution of the algebraic Riccati equation. A reference-command input $r_k$ that describes the desired position at a given time is also provided. The block 22 is characterized by a state-command vector $N_y$ that defines the relationship between the reference-command input and the state at equilibrium. This reference-command input may be regarded as a specific trajectory that the plant has to follow during normal operation. To achieve a zero steady-state error, the control circuitry is augmented with an integrator 23. The integrator 23 has as an input $e_k$ the difference between the reference signal $r_k$ and the current y-position, and outputs an integral term $\eta_k$ which is added to the controller output to yield the control signal $u_k$. This is then converted to analog control signal u(t) by digital-to-analog converter (D/A) 24. The estimator 20 and the integrator 23 receive an input control-state signal from the adjustment controller 9, which is active whenever the control apparatus is in fast-adjustment mode. During fast-adjustment, the respective internal states of estimator 20 and the integrator 23 are either held constant, or set to values that correspond to the predicted state of the scanner at the end of the fast-adjustment. In the normal control state of apparatus 1, i.e. other than during fast-adjustment, the resulting signal u(t) is output via switch 25 under control of the control-state output of adjustment controller 9. The signal u(t), which denotes the control input to scanner 3 for the normal control operations, is then summed with an input w(t), which represents the process noise and external disturbances that are applied to the plant, to produce the input to scanner 3. As already mentioned, this input is concerned with y-positional control only, x-positional control of the scanner being handled independently in this embodiment as indicated in the figure.

The adjustment controller 9 in this embodiment comprises a finite state machine (FSM) 30 and a threshold detector 31. FSM 30 receives information about the current operating state of the storage device via the drive state input as described above. Based on this, and the servo output $\hat{y}_{meas}(t_m)$, the FSM determines when fast-adjustment of the scanner position is to be done, and the particular action to be taken. When the drive state input indicates that the device is currently in track-follow mode, the threshold detector 31 monitors the servo output $\hat{y}_{meas}(t_m)$ to detect occurrence of a shock. Specifically, threshold detector 31 signals the occurrence of a shock to FSM 30 if the difference between $\hat{y}_{meas}(t_m)$ and the y-position of the current target track indicated by the drive state signal exceeds a preset threshold value. In this event, the FSM 30 initiates the shock-compensation mode of adjustment signal generator 10. When the drive state input indicates that the device is in settle mode, reading of the track ID from the special servo patterns, as described for example in US Patent Application Publication 2006/0039250A1 mentioned earlier, indicates to FSM 30 when the settle operation should be complete. On completion of the settle procedure, the FSM determines whether the current track indicated by the servo output $\hat{y}_{meas}(t_m)$ corresponds to the desired target track as indicated by the drive state input for the current settle operation. In the affirmative, track follow starts using a position error signal generated by using the servo bursts from the special servo patterns, as described for example in the Eleftheriou et al reference above. If not, however, then the FSM initiates the fast-correction mode of adjustment signal generator 10. On initiation of either fast-adjustment mode, the FSM 30 supplies an appropriate input signal $i_a$ to signal generator 10.

Adjustment signal generator 10 in this embodiment includes a finite impulse response (FIR) filter 33, an up-sampler 34, a delay 35, a multiplier 36, adders 37 and 38, and a D/A converter 39. Filter 33 is selectively operable to provide two different filter characteristics under control of the mode control signal from adjustment controller 9. In particular, on initiation of either of the two fast-adjustment modes, FSM 30 sets the mode control signal to indicate the current mode, and the appropriate set of filter coefficients is thereby selected in FIR 33 to provide the desired impulse response for that mode. The input signal $i_a$, and the value of the parameter $\beta$ shown in the figure, are also set by FSM 30 in dependence on the required fast-adjustment mode. Considering first operation in the fast-correction mode for positional correction at the end of the settle procedure, the FSM sets $\beta$=0 in this mode. This negates the effect of delay 35 for this mode, whereby the signal $z(t_m)$ at the input to up-sampler 34 in the figure is simply the input signal $i_a$ from FSM 30. This is given by:

$$z(t_m) = z(mT_s) = \begin{cases} \Delta y_{track}, & m = m_0 \\ 0, & \text{otherwise} \end{cases}$$

where: $T_S$ is clock interval of servo channel 2; $m_0 T_S$ is the start time of the fast-correction mode; and $\Delta y_{track}$ is the distance from the current track to the target track. Here, $\Delta y_{track}$ does not necessarily represent an integral number of tracks, but may just be any lateral offset from the target track.

The signal $z(t_m)$ is then up-sampled by a factor K in up-sampler 34 to provide the higher clock rate required for the fast adjustment control signal, and then input to FIR 33 which is configured as described above for the fast-correction mode. A typical value for the up-sampling factor K here might be in the range 5 to 50. A feed-forward term $f(r_l)$ and an integral control term $\eta_l$ are then added to the filtered signal output by FIR 33 at adder 38. These terms $f(r_l)$ and $\eta_l$ are, respectively, the feed-forward term and the integral term provided in the known control circuitry of the Pantazi et al reference above and need not be discussed in detail here. Briefly, however, the feed-forward term $f(r_l)$ is determined by the input reference signal $r_k$ and contributes a value dependent on the control current at the point of switching from the normal to fast-adjustment control modes. The integral term $\eta_l$ compensates for mismatch between the theoretical and actual plant parameters for the storage device design. Both of these terms remain constant during the fast-adjustment. The resulting adjustment signal ζ(t_l) is digital-to-analog converted by D/A converter 39 with a clock period of $t_i=1/(Kf_s)$, where $f_s=1/T_s$, and is given by $$\zeta\left(l\frac{T_s}{K}\right) = \Delta y_{track} g_1\left[(l-m_0K)\frac{T_s}{K}\right] + f(r_l) + \eta_l$$

where $g_1(t_l)$ is the impulse response of the FIR filter 33 for the fast-correction mode discussed further below. The control-state input to switch 25 is set by FSM 30 so that the adjustment signal ζ(t_l) is output by the switch during the fast-adjustment mode. The adjustment signal ζ(t_l), with the addition of signal w(t), thus forms the control signal for scanner 3. This control signal causes scanner 3 to effect fast positional displacement of the probe array to centre the array on the target track, thereby correcting the positional error at the end of the settle procedure.

Considering now operation in the shock-compensation mode, in this case FSM 30 sets the parameter β to a value $0 \leq \beta \leq 1$. The parameter β assumes a fixed value for the duration of the fast-adjustment, and is typically in the range 0.9 to 0.99. The adjustment input signal $i_a$ supplied by FSM 30 in this mode is given by $$i_a = \hat{y}_{meas}(mT_s) - y_{track} \quad m=m_0, m_0+1, \ldots, m_L$$

The effect of multiplier 36, delay 35 and adder 37 is to delay the input signal $i_a$ and add the input signal at a given time to the delayed input signal scaled by the factor β to produce a summation signal $z(t_m)$. In more detail, the summation signal $z(t_m)$ is given by:

$$z(t_m) = z(mT_s) = \begin{cases} \hat{y}_{meas}(mT_s) - y_{track}, & |\hat{y}_{meas}(mT_s) - y_{track}| > y_{thres}, m=m_0 \\ \hat{y}_{meas}(mT_s) - y_{track} + \\ \beta(\hat{y}_{meas}[(m-1)T_s] - y_{track}), & m=m_0+1, \ldots, m_L \\ 0, & \text{otherwise} \end{cases}$$

where: $y_{track}$ denotes the lateral position of the current target track for the track-follow operation; $y_{thres}$ is the threshold value for shock detection set in threshold detector 31; and $(m_L-m_0+1)T_s$ is the duration of the shock event. An end-of-event flag is asserted by the FSM 30 at time index $n_L$ if no value of $z(mT_s)$ exceeds the threshold for a time interval corresponding to the time span of the FIR filter 33. Filter 33, which is configured as described above for the shock-compensation mode, filters the up-sampled summation signal to produce an adjustment signal ζ(t_l) given by $$\zeta\left(l\frac{T_s}{K}\right) = \sum_{i=n-\lfloor\frac{N-1}{K}\rfloor}^{n} z(iT_s)g_2\left[(l-iK)\frac{T_s}{K}\right] + f(r_l) + \eta_l$$

where $g_2(t_l)$ is the impulse response of the FIR 33 for the shock-compensation discussed further below. The adjustment signal is output via switch 25, under control of the control-state signal from FSM 30, to produce the control signal for scanner 3 as before. In this mode, the adjustment signal effects fast positional displacement of the scanner 3 to counter the vibrations produced by the shock.

In this preferred embodiment, the impulse response of the FIR filter 33 in each fast-adjustment mode is determined so that the resulting adjustment signal causes the probe-array to follow a target trajectory during the fast positional adjustment. More particularly, the control signal in the fast-adjustment control modes of apparatus 1 corresponds to the solution of the Euler-Lagrange equations resulting in trajectory following. Thus, the power consumption for the positional correction for a given target trajectory is reduced. The following analysis explains the technique employed here.

Consider the plant described by the discrete-time-equivalent state-space model:

$$x(k+1) = \Phi x(k) + \Gamma \zeta(k)$$

where x(k) denotes the vector of the n state variables, ζ(k) is the control signal, and Φ and Γ are constant matrices that depend on the plant parameters. The goal is to determine the control signal $\zeta(k)=u(k)+u_0$ such that the cost function $$J = \sum_{k=0}^{N}\left[\frac{1}{2}[x(k)-x_t(k)]^T Q_1[x(k)-x_t(k)] + \frac{1}{2}u^T(k)Q_2 u(k)\right]$$

is minimum, where $Q_1$ and $Q_2$ are symmetric positive definite matrices, and $x_t(k)$ is the desired N-step trajectory between initial and final equilibrium states. Note that $u_0$ represents the constant control signal that keeps the system in equilibrium at the initial state, and is expressed as $$\Gamma u_0 = (I-\Phi))x(0)$$

Introducing Lagrange multipliers, the function to minimize becomes $$J = \sum_{k=0}^{N}\left[\begin{array}{l}\frac{1}{2}[x(k)-x_t(k)]^T Q_1[x(k)-x_t(k)] + \frac{1}{2}u^T(k)Q_2 u(k) + \\ \lambda^T(k+1)[-x(k+1)+\Phi x(k)+\Gamma(u(k)+u_0)]\end{array}\right]$$

Taking partial derivatives yields $$\frac{\partial J}{\partial u(k)} = u^T(k)Q_2 + \lambda^T(k+1)\Gamma = 0 \qquad \text{control equations}$$

$$\frac{\partial J}{\partial \lambda(k+1)} = -x(k+1)+\Phi x(k)+\Gamma((k)+u_0) = 0 \qquad \text{state equations}$$

$$\frac{\partial J}{\partial x(k)} = [x(k)-x_t(k)]^T Q_1 - \lambda^T(k) + \lambda^T(k+1)\Phi = 0 \qquad \text{adjoint equations}$$

Getting from the adjoint equations $$\lambda(k+1) = \Phi^{-T}[\lambda(k)-Q_1(x(k)-x_t(k))]$$

from the control equations $$u(k) = Q_2^{-1}\Gamma^T\Phi^{-T}[Q_1(x(k)-x_t(k))-\lambda(k)];$$

and from the state equations $$x(k+1) = (\Phi+\Gamma Q_2^{-1}\Gamma^T\Phi^{-T}Q_1)x(k) - \Gamma Q_2^{-1}\Gamma^T\Phi^{-T}\lambda(k) - \Gamma Q_2^{-1}\Gamma^T\Phi^{-T}Q_1 x_t(k) + \Gamma u_0$$

we obtain the recursive equations describing the state and Lagrangian evolution $$\begin{bmatrix} x(k+1) \\ \lambda(k+1) \end{bmatrix} = \begin{bmatrix} \Phi + \Gamma Q_2^{-1}\Gamma^T\Phi^{-T}Q_1 & -\Gamma Q_2^{-1}\Gamma^T\Phi^{-T} \\ -\Phi^{-T}Q_1 & \Phi^{-T} \end{bmatrix} \begin{bmatrix} x(k) \\ \lambda(k) \end{bmatrix} + \begin{bmatrix} -\Gamma Q_2^{-1}\Gamma^T\Phi^{-T}Q_1 \\ \Phi^{-T}Q_1 \end{bmatrix} x_t(k) + \begin{bmatrix} \Gamma u_0 \\ 0 \end{bmatrix}$$

which can be expressed as $$\begin{bmatrix} x(k+1) \\ \lambda(k+1) \end{bmatrix} = H_C \begin{bmatrix} x(k) \\ \lambda(k) \end{bmatrix} + \Xi x_t(k) + \begin{bmatrix} \Gamma u_0 \\ 0 \end{bmatrix}$$

where $$H_C = \begin{bmatrix} \Phi + \Gamma Q_2^{-1}\Gamma^T\Phi^{-T}Q_1 & -\Gamma Q_2^{-1}\Gamma^T\Phi^{-T} \\ -\Phi^{-T}Q_1 & \Phi^{-T} \end{bmatrix}$$

is the control Hamiltonian matrix and $$\Xi = \begin{bmatrix} -\Gamma Q_2^{-1}\Gamma^T\Phi^{-T}Q_1 \\ \Phi^{-T}Q_1 \end{bmatrix}$$

is a constant matrix.

The Hamiltonian can be diagonalized in the form $$H_C^* = \begin{bmatrix} E^{-1} & 0 \\ 0 & E \end{bmatrix} = W^{-1} H_C W$$

Where $E = \mathrm{diag}\{\alpha_1, \ldots, \alpha_n\}$, and W is the matrix of eigenvectors of $H_C$ that can be expressed as $$W = \begin{bmatrix} X_I & X_O \\ \Lambda_I & \Lambda_I \end{bmatrix}$$

The matrix W can be used to transform x and $\lambda$ to the normal modes of the system, that is $$\begin{bmatrix} x^*(k) \\ \lambda^*(k) \end{bmatrix} = W^{-1} \begin{bmatrix} x(k) \\ \lambda(k) \end{bmatrix}$$

Defining $$\begin{bmatrix} x_{tt}^*(k) \\ \lambda_{tt}^*(k) \end{bmatrix} = W^{-1} \left[ \Xi x_t(k) + \begin{bmatrix} \Gamma u_0 \\ 0 \end{bmatrix} \right]$$

We express the recursive equations in the new basis as $$\begin{bmatrix} x^*(k+1) \\ \lambda^*(k+1) \end{bmatrix} = \begin{bmatrix} E^{-1} & 0 \\ 0 & E \end{bmatrix} \begin{bmatrix} x^*(k) \\ \lambda^*(k) \end{bmatrix} + \begin{bmatrix} x_{tt}^*(k) \\ \lambda_{tt}^*(k) \end{bmatrix}$$

To find the solution of the system of recursive equations, we need to determine the boundary conditions. We have x(0) given, and $$\lambda(N) = Q_1[x(N) - x_t(N)]$$

as we seek a solution for which u(N)=0. Defining $$W^{-1} = \begin{bmatrix} A & B \\ C & D \end{bmatrix}$$

and observing $$\begin{bmatrix} x^*(N) \\ \lambda^*(N) \end{bmatrix} = W^{-1} \begin{bmatrix} x(N) \\ Q_1[x(N) - x_t(N)] \end{bmatrix}$$

we express the final conditions as $$\begin{bmatrix} x^*(N) \\ \lambda^*(N) \end{bmatrix} = \begin{bmatrix} A + BQ_1 \\ C + DQ_1 \end{bmatrix} x(N) - \begin{bmatrix} BQ_1 \\ DQ_1 \end{bmatrix} x_t(N)$$

Similarly we express the initial conditions as $$\begin{bmatrix} x^*(0) \\ \lambda^*(0) \end{bmatrix} = W^{-1} \begin{bmatrix} x(0) \\ \lambda(0) \end{bmatrix} = \begin{bmatrix} Ax(0) + B\lambda(0) \\ Cx(0) + D\lambda(0) \end{bmatrix}$$

To determine $\lambda(0)$ and x(N), we express the solution of the system of recursive equations as $$\begin{cases} x_i^*(k) = \alpha_i^k x_i^*(0) + \sum_{j=0}^{k-1} \alpha_i^{j-k} x_{tt,i}^*(j), & i = 1, \ldots, n \\ \lambda_i^*(k) = \alpha_{n+i}^k \lambda_i^*(0) + \sum_{j=0}^{k-1} \alpha_{n+i}^{j-k} \lambda_{tt,i}^*(j), & i = 1, \ldots, n, \quad \alpha_{n+i} = \alpha_i^{-1} \end{cases}$$

For k=N, using the expressions of x*(0), $\lambda$*(0), x*(N) and $\lambda$*(N), we get $$\begin{cases} (A + BQ_1)x(N) = E^{-N}(Ax(0) + B\lambda(0)) + \sum_{j=0}^{N-1} E^{j-N} x_{tt}^*(j) + BQ_1 x_t(N) \\ (C + DQ_1)x(N) = E^N(Cx(0) + D\lambda(0)) + \sum_{j=0}^{N-1} E^{N-j} \lambda_{tt}^*(j) + DQ_1 x_t(N) \end{cases}$$

which can be solved for $\lambda(0)$ and $x(N)$. Therefore the general solution is given by $$\begin{bmatrix} x(k) \\ \lambda(k) \end{bmatrix} = W \begin{bmatrix} x^*(k) \\ \lambda^*(k) \end{bmatrix}$$

with initial conditions $$\begin{bmatrix} x^*(0) \\ \lambda^*(0) \end{bmatrix} = W^{-1} \begin{bmatrix} x(0) \\ \lambda(0) \end{bmatrix}$$

Finally, the control signal for the optimum trajectory follower (OTF) is obtained as $$\zeta(k) = u_0 + Q_2^{-1} \Gamma^T \Phi^{-T} [Q_1(x(k) - x_t(k)) - \lambda(k)]$$

While the control circuitry 7 may employ an OTF-based controller in a preferred embodiment instead of an LQG-based controller discussed earlier, various other control circuitry, such as PTOS (proximate time optimal servomechanism) or PID (proportional, integral, and derivative) circuitry could be used if desired.

The following analysis sets out a simplification to the OTF signal derivation given above, which is employed in this preferred embodiment of the adjustment signal generator 10. Within the OTF approach, we restrict ourselves in this case to trajectories of the form $$x_t(k) = x_0 + h\tilde{x}_t(k)$$

where $x_0$ is a known initial equilibrium state. As before, let $u_0$ represent the constant control signal that keeps the system in equilibrium at the initial state. Defining $$\Delta x(k) = x(k) - x_t(k)$$

we obtain the recursive equations describing the state and Lagrangian evolution $$\begin{bmatrix} x_t(k+1) + \Delta x(k+1) \\ \lambda(k+1) \end{bmatrix} = \begin{bmatrix} \Phi + \Gamma Q_2^{-1} \Gamma^T \Phi^{-T} Q_1 & -\Gamma Q_2^{-1} \Gamma^T \Phi^{-T} \\ -\Phi^{-T} Q_1 & \Phi^{-T} \end{bmatrix} \begin{bmatrix} x_t(k) + \Delta x(k) \\ \lambda(k) \end{bmatrix} + \begin{bmatrix} -\Gamma Q_2^{-1} \Gamma^T \Phi^{-T} Q_1 \\ \Phi^{-T} Q_1 \end{bmatrix} x_t(k) + \begin{bmatrix} \Gamma u_0 \\ 0 \end{bmatrix}$$

which can be expressed as $$\begin{bmatrix} \Delta x(k+1) \\ \lambda(k+1) \end{bmatrix} = H_C \begin{bmatrix} \Delta x(k) \\ \lambda(k) \end{bmatrix} + h \begin{bmatrix} \tilde{x}_t(N) - \tilde{x}_t(k+1) - \Phi(\tilde{x}_t(N) - \tilde{x}_t(k)) \\ 0 \end{bmatrix}$$

where $H_C$ is the control Hamiltonian matrix defined earlier. The matrix W of eigenvectors of $H_C$ is again used to transform $\Delta x$ and $\lambda$ to the normal modes of the system, yielding $$\begin{bmatrix} \Delta x^*(k) \\ \lambda^*(k) \end{bmatrix} = W^{-1} \begin{bmatrix} \Delta x(k) \\ \lambda(k) \end{bmatrix}$$

Defining $$\begin{bmatrix} \hat{x}_{tt}^*(k) \\ \hat{\lambda}_{tt}^*(k) \end{bmatrix} = hW^{-1} \begin{bmatrix} \tilde{x}_t(N) - \tilde{x}_t(k+1) - \Phi(\tilde{x}_t(N) - \tilde{x}_t(k)) \\ 0 \end{bmatrix}$$

we express the recursive equations in the new basis as $$\begin{bmatrix} \Delta x^*(k+1) \\ \lambda^*(k+1) \end{bmatrix} = \begin{bmatrix} E^{-1} & 0 \\ 0 & E \end{bmatrix} \begin{bmatrix} \Delta x^*(k) \\ \lambda^*(k) \end{bmatrix} + \begin{bmatrix} \hat{x}_{tt}^*(k) \\ \hat{\lambda}_{u}^*(k) \end{bmatrix}$$

Observing $\Delta x(0) = 0$ and $\lambda(N) = Q_1 \Delta x(N)$, we express the final conditions as $$\begin{bmatrix} \Delta x^*(N) \\ \lambda^*(N) \end{bmatrix} = \begin{bmatrix} A + BQ_1 \\ C + DQ_1 \end{bmatrix} \Delta x(N)$$

and the initial conditions as $$\begin{bmatrix} \Delta x^*(0) \\ \lambda^*(0) \end{bmatrix} = W^{-1} \begin{bmatrix} \Delta x(0) \\ \lambda(0) \end{bmatrix} = \begin{bmatrix} B\lambda(0) \\ D\lambda(0) \end{bmatrix}$$

To determine $\lambda(0)$ and $\Delta x(N)$, we express the solution of the recursive equations as $$\begin{cases} \Delta x_i^*(k) = \alpha_i^k \Delta x_i^*(0) + \sum_{j=0}^{k-1} \alpha_i^{j-k} \hat{x}_{tt,i}^*(j), & i = 1, \ldots, n \\ \lambda_i^*(k) = \alpha_{n-i}^k \lambda_i^*(0) + \sum_{j=0}^{k-1} \alpha_{n+i}^{j-k} \hat{\lambda}_{tt,i}^*(j), & i = 1, \ldots, n, \; a_{n+i} = \alpha_i^{-1} \end{cases}$$

For $k=N$, using the expressions of $\Delta x^*(0)$, $\lambda^*(0)$, $\Delta x^*(N)$ and $\lambda^*(N)$, we get $$\begin{cases} (A + BQ_1)\Delta x(N) = E^{-N} B\lambda(0) + \sum_{j=0}^{N-1} E^{j-N} \hat{x}_{tt}^*(j) \\ (C + DQ_1)\Delta x(N) = E^N D\lambda(0) + \sum_{j=0}^{N-1} E^{N-j} \hat{\lambda}_{tt}^*(j) \end{cases}$$

which can be solved for λ(0), Δx(N). In this case the system equations can be written as $$\begin{cases} (A+BQ_1)\Delta x(N) - E^{-N}B\lambda(0) = h\sum_{j=0}^{N-1} E^{j-N}A\begin{bmatrix} \tilde{x}_t(N) - \tilde{x}_t(j+1) - \\ \Phi(\tilde{x}_t(N) - \tilde{x}_t(j)) \end{bmatrix} \\ (C+DQ_1)\Delta x(N) - E^N D\lambda(0) = h\sum_{j=0}^{N-1} E^{N-j}C\begin{bmatrix} \tilde{x}_t(N) - \tilde{x}_t(j+1) - \\ \Phi(\tilde{x}_t(N) - \tilde{x}_t(j)) \end{bmatrix} \end{cases}$$

which yields for the initial conditions a solution of the form $$\begin{cases} \Delta x(0) = 0 \\ \lambda(0) = hf(Q_1, H_C(Q_1, Q_2), \tilde{x}_t(\cdot)) \end{cases}$$

Therefore the general solution is given by $$\begin{bmatrix} \Delta x(k) \\ \lambda(k) \end{bmatrix} = W^{-1} \begin{bmatrix} \Delta x^*(k) \\ \lambda^*(k) \end{bmatrix}$$

with initial conditions $$\begin{bmatrix} \Delta x^*(0) \\ \lambda^*(0) \end{bmatrix} = W^{-1} \begin{bmatrix} \Delta x(0) \\ \lambda(0) \end{bmatrix}$$

Note that the recursive equations describing the Lagrangian evolution take in this case the form $$\begin{bmatrix} \Delta x(k+1) \\ \lambda(k+1) \end{bmatrix} = H_C \begin{bmatrix} \Delta x(k) \\ \lambda(k) \end{bmatrix} + h \begin{bmatrix} \tilde{x}_t(N) - \tilde{x}_t(k+1) - \Phi(\tilde{x}_t(N) - \tilde{x}_t(k)) \\ 0 \end{bmatrix}$$

As the initial conditions depend linearly on h, the general solution takes the form $$\begin{cases} \Delta x(k) = h\Delta \tilde{x}(k) \\ \lambda(k) = h\tilde{\lambda}(k) \end{cases}$$

where $$\begin{cases} \Delta \tilde{x}(k) = \Delta x(k; Q_1, H_C(Q_1), \tilde{x}_t(\cdot))|_{h=1} \\ \tilde{\lambda}(k) = \lambda(k; Q_1, H_C(Q_1), \tilde{x}_t(\cdot))|_{h=1} \end{cases}$$

Therefore the control signal for fast adjustments based on optimum trajectory following is given by $$\zeta(k) = u_0 + h\{Q_2^{-1}\Gamma^T\Phi^{-T}(Q_1\Delta\tilde{x}(k) - \tilde{\lambda}(k))\}$$

Figure 3:
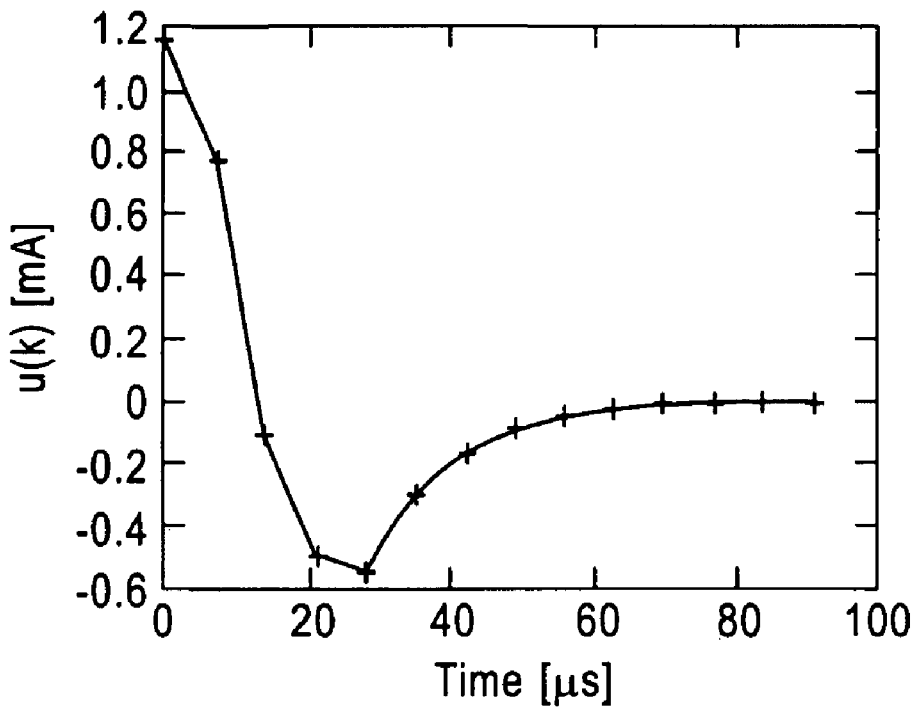
FIG. 3 shows the impulse response of a first filter of the FIG. 2 embodiment.
Figure 4:
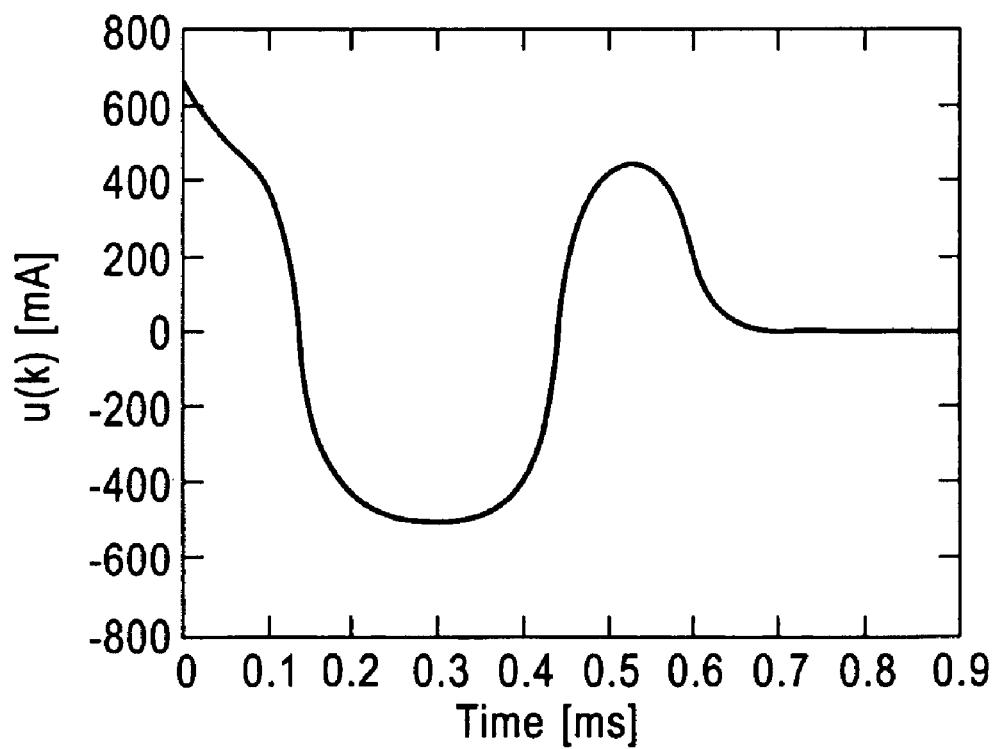
FIG. 4 shows the impulse response of a second filter in an alternative embodiment of the control apparatus for a tape drive.

The above procedure applies to computation of the adjustment signal $\zeta(t_l)$ in the fast-adjustment modes, and determines the appropriate impulse responses $g_1(t_l)$ and $g_2(t_l)$ for filter 33 as will be apparent to those skilled in the art. By way of example, FIG. 3 illustrates the impulse response of filter 33 in this embodiment for the fast-correction mode during seek-and-settle. FIG. 4 illustrates the impulse response derived for filter 33 in the shock-compensation mode in a similar embodiment for controlling the read/write head of a tape drive. Apart from the differences in servo system 2 due to the different read/write mechanism, the structure and operation of control apparatus 1 for the two embodiments is substantially identical.

The graphs of FIGS. 5 and 6 demonstrate operation of the apparatus 1 in the fast-correction mode in a simulation for a probe-storage device with a scanning array having the parameters indicated at the top-left of FIG. 5. This simulation set a target velocity, along the track at the end of the seek-and-settle procedure, of 3 nm/μs, with a symbol interval of 14 μs, and a pit pitch and diameter of 42 nm and 21 nm respectively, a "pit" being an indentation formed in the storage medium, the presence or absence of which provides the system of information storage in these devices. The diagonal trace in the left-hand graph shows the x,y movement of the scanner during seek. This is followed by the settle procedure and then track-following at the desired y-position. The enlargement in the right-hand graph indicates the settle procedure more clearly. This commences at x=−50 μm with the generation of the servo bursts, which are obtained from the special servo patterns and are processed by the servo channel 5. At approximately x=−47 μm, the settle procedure ends and the fast-correction mode is triggered by FSM 30 to correct the y-position to the target track. FIG. 6 illustrates this process in more detail. The left-hand graph here shows the y-position with time from the start of settle. The four graphs on the right show the read-out from the four laterally-offset servo fields A, B, C and D on the storage medium surface from which the servo output ŷ is derived in this device, as described, for example, in the Eleftheriou et al reference above. At the end of settle the probe-array is positioned at the track above the target track. The fast-correction mode is triggered at approximately t=0.7 ms and lasts for just over 100 μs. During this time, as indicated by the trace, fast positional adjustment in the y-direction is effected to correct the one-track offset. Fine-tuning of the y-position for centering on the target track is then performed in the usual way by switching back to the normal control operation of positioning system 5. The right-hand graphs show the signals from servo fields B, C, A and D successively peaking during this procedure as the y-position successively moves through these fields, culminating in centering on the target track in the D-field.

The graphs of FIG. 7 illustrate operation of the shock-compensation mode, in this case for the tape drive embodiment of the plant control apparatus. Although these particular graphs illustrate operation in the tape-drive embodiment, the operation of the shock compensation mode is entirely analogous in the probe-storage device embodiment. The left-hand graph shows the oscillations imparted to the tape by a tape shift. Note that if a tape-shift occurs it is the tape that is subject to oscillations, rather than the actuator. Tape shifts occur for example when a transport winding mechanism winds the tape with inadequate tension. Later handling will then cause the tape to shift from side to side against the flanges, leading to fast oscillatory behavior that poses a challenge to the track-following servo. The control circuitry should ideally provide a control signal that forces the actuator to follow the tape oscillations, thus compensating for the tape displacement and yielding a y-error that is much smaller than the error that would be obtained without entering the shock-compensation mode. In the case of an external shock, it is the actuator that is subject to an external force. The control circuitry then provides a control signal that counters the effects of the application of the external force. This is also done by driving the servo system in shock-compensation mode. In the considered example the tape is subject to an initial y-acceleration of 50 m/s² for 0.2 ms, followed by a deceleration of 50 m/s² for 0.2 ms, with a constant tape velocity of 1.6 m/s in the x-direction. The damped y-oscillations after the initial phase of 0.4 ms, i.e. for $t > t_0$, are given by $$y(t-t_0) = A \cos[2\pi f_0(t-t_0)] \exp[-(t-t_0)/T_0]$$

with A=2 μm, $f_0$=125 Hz, $t_0 \approx 1.9$ ms, and $T_0$=10 ms. In response, the shock-compensation mode is initiated as described above, resulting in generation of the adjustment control signal shown in the upper graph of the figure to effect fast positional adjustment of the actuator. This results in a y-displacement of the read/write head with respect to the desired track, and resulting small residual error in the y-direction, shown by the traces indicated in the left-hand graph. The dotted trace in the enlargement of this graph shows the estimated residual error as indicated by the servo output ŷ. The resulting fast-adjustment of the position of the read/write head thus serves to compensate for the vibrations due to the tape shift. FIG. 8 shows equivalent graphs for a tape shift with an impulse applied over an initial phase of 0.8 ms, resulting in the modified traces and parameters indicated in the figure.

The fast-adjustment apparatus provides an elegantly simple and highly efficient mechanism for temporarily increasing the bandwidth of the positional control system to effect fast positional adjustments in the two fast-adjustment modes. However, while a particularly preferred embodiment has been described, various alternatives and modifications can be envisaged. For example, alternative embodiments could allow for simultaneous operation of adjustment apparatus 8 in the fast-correction and shock-compensation modes. This would allow compensation for disturbances such as shocks occurring during the positional adjustments in a seek-and-settle procedure. To achieve this, two filters 33 can be provided allowing independent operation of the adjustment signal generator in the two modes in response to respective input signals from adjustment controller 30. The adjustment signals produced as described above for the two modes can then be superimposed to provide a composite adjustment signal for effecting both types of positional adjustment simultaneously. Also, while an FSM 30 is ideally employed in adjustment controller 9 for efficiency and speed of operation, a computer program or other structures may be employed to implement the functionality here.

While digital circuitry is employed for implementation of the control apparatus above, the apparatus could equally be implemented in analog circuitry if desired. In this case, of course, separate analog filters would implement the configurable filter 33 of the digital circuit. Also, while positional adjustment in a single dimension is dealt with in the embodiments described, appropriate replication of circuitry could provide for positional control in two or even three dimensions in a given system where this is deemed desirable. Moreover, while application of the fast-adjustment apparatus to particular storage devices has been described, embodiments of the invention may be applied in other systems which rely on positioning of a plant and in which similar considerations therefore apply, for example disk drives and video camera recorders using DVD-RAM drives. Various other changes and modifications can be made to the specific embodiments described without departing from the scope of the invention.

I claim:

1. An apparatus for fast-adjustment of the position of a plant in a servo system in which a servo output indicative of the plant position is provided to a positioning system for positioning the plant in dependence on the servo output, the apparatus comprising:

an adjustment signal generator, operable in a fast-correction mode and a shock-compensation mode, for generating an adjustment signal for supply to the positioning system to effect fast positional adjustment of the plant; and an adjustment controller for receiving said servo output, the adjustment controller being adapted to detect from the servo output occurrence of a disturbance affecting positioning of the plant and, in response, to initiate the shock-compensation mode of the adjustment signal generator, and adapted, in response to indication of an error in positioning of the plant, to initiate the fast-correction mode of the adjustment signal generator, and to supply an input signal dependent on the servo output to the adjustment signal generator on initiation of each said mode; wherein:

the adjustment signal generator is adapted to process the input signal to generate the adjustment signal such that, in the fast-correction mode the adjustment signal effects adjustment of the plant position to correct said error, and in the shock-compensation mode the adjustment signal effects adjustment of the plant position to counter the effect of said disturbance;

the adjustment signal generator comprises a first filter for filtering the input signal in the fast-correction mode; a delay for delaying the input signal in the shock-compensation mode; an adder for adding the input signal to the delayed input signal in the shock-compensation mode to produce a summation signal; and a second filter for filtering the summation signal in the shock-compensation mode;

the first and second filters are provided by selective configuration of a single filter to provide first and second filter characteristics; and the adjustment controller is adapted to select the filter configuration on initiation of each said mode.

2. An apparatus according to claim 1 wherein: the adjustment signal generator is operable simultaneously in the fast-correction and shock-compensation modes; the adjustment controller is adapted to supply respective input signals to the adjustment signal generator during simultaneous operation in the fast-correction and shock-compensation modes; and the adjustment signal generator is adapted, during said simultaneous operation, to process the respective input signals for the fast-correction and shock-compensation modes and to superimpose the processed input signals to produce the adjustment signal.

3. An apparatus according to claim 1, wherein the first and second filters are finite impulse response filters.

4. An apparatus according to claim 3 wherein the coefficients of each of the first and second filters are selected such that the adjustment signal corresponds to a solution of the Euler-Lagrange equations for causing the plant position to follow a target trajectory during the positional adjustment.

5. An apparatus according to claim 1 wherein the adjustment controller is adapted for receiving a state indicator signal for indicating different operating states of the plant, and wherein the adjustment controller includes a finite state machine defining conditions for initiating the fast-correction and shock-compensation modes in dependence on the servo output and said operating states.

* * * * *